(12) United States Patent
Schunack et al.

(10) Patent No.: US 9,815,339 B2
(45) Date of Patent: Nov. 14, 2017

(54) PNEUMATIC VEHICLE TYRE WITH AIR-DISCHARGING THREADS AND METHOD FOR MANUFACTURING AN ELECTRICALLY CONDUCTIVE COATING FOR THE AIR-DISCHARGING THREADS

(75) Inventors: Michael Schunack, Hannover (DE); Lars Sonnenberg, Hamburg (DE); Güenter Wahl, Hohenhameln-Clauen (DE); Carole Justine, Scharrel (DE); Mehmet Sadettin Fidan, Garbsen (DE); Norbert Kendziorra, Garbsen (DE); Christian Weber, Garbsen (DE)

(73) Assignee: CONTINENTAL REIFEN DEUTSCHLAND GMBH, Hannover (DE)

( * ) Notice: Subject to any disclaimer, the term of this patent is extended or adjusted under 35 U.S.C. 154(b) by 569 days.

(21) Appl. No.: 13/704,801

(22) PCT Filed: May 2, 2011

(86) PCT No.: PCT/EP2011/056918
§ 371 (c)(1),
(2), (4) Date: Feb. 28, 2013

(87) PCT Pub. No.: WO2011/157473
PCT Pub. Date: Dec. 22, 2011

(65) Prior Publication Data
US 2013/0174951 A1     Jul. 11, 2013

(30) Foreign Application Priority Data
Jun. 18, 2010  (DE) .................. 10 2010 017 444

(51) Int. Cl.
*B60C 19/08*     (2006.01)
*D06M 11/74*    (2006.01)
(Continued)

(52) U.S. Cl.
CPC .......... *B60C 19/084* (2013.01); *D06M 11/74* (2013.01); *D06M 15/693* (2013.01);
(Continued)

(58) Field of Classification Search
CPC ..... B60C 19/08; B60C 19/084; B60C 19/086; B60C 2019/008
See application file for complete search history.

(56) References Cited

U.S. PATENT DOCUMENTS 2,640,523 A * 6/1953 Palmer ..................... 152/153
4,363,346 A * 12/1982 Pepe ........................ 152/556
(Continued)

FOREIGN PATENT DOCUMENTS

DE     23 62 902      6/1975
DE     3 014 268      10/1981
(Continued)

OTHER PUBLICATIONS

McDonel, E.T.. The Pneumatic Tire. Aug. 2005. NHTSA. Chapter 3: Tire Cord and Cord-to-Rubber Bonding. pp. 80-85.*
(Continued)

*Primary Examiner* — Robert Dye
(74) *Attorney, Agent, or Firm* — Greenblum & Bernstein, P.L.C.

(57) ABSTRACT

The invention relates to a pneumatic vehicle tire (1) of radial design having a carcass (4) and having components (9, 10) which adjoin the carcass (4), wherein thread-shaped elements (11) are arranged on at least one of the two surfaces of the carcass (4) and preferably serve to discharge occluded air between the carcass (4) and the adjoining components (9, 10) during the construction of the tire. In order to improve the electrical conductivity of the pneumatic vehicle tire (1), at least one thread-shaped element (11) has a coating which is electrically conductive and jointly forms an electrically
(Continued)

conductive, thread-shaped element (12) which has an electrical resistance of $<1\times10^7$ Ohm/cm. The invention also relates to a method for manufacturing the electrically conductive coating.

18 Claims, 1 Drawing Sheet

(51) Int. Cl.
*D06M 15/693* (2006.01)
*B60C 19/00* (2006.01)
*B29D 30/30* (2006.01)
*C08K 3/04* (2006.01)
*C08K 5/00* (2006.01)
*C08K 9/04* (2006.01)

(52) U.S. Cl.
CPC ............. *B29D 2030/3071* (2013.01); *B29K 2995/0005* (2013.01); *B60C 2019/008* (2013.01); *C08K 3/04* (2013.01); *C08K 5/0075* (2013.01); *C08K 9/04* (2013.01)

(56) References Cited

U.S. PATENT DOCUMENTS

| | | | | |
|---|---|---|---|---|
| 2005/0087275 | A1* | 4/2005 | Zanzig et al. | 152/152.1 |
| 2008/0308203 | A1* | 12/2008 | Kunisawa et al. | 152/152.1 |
| 2010/0243115 | A1 | 9/2010 | Wada | |
| 2011/0024017 | A1* | 2/2011 | Miyazaki | 152/564 |
| 2011/0308675 | A1* | 12/2011 | Hinc et al. | 152/152.1 |

FOREIGN PATENT DOCUMENTS

| | | |
|---|---|---|
| EP | 2 193 939 | 6/2010 |
| EP | 2 233 323 | 9/2010 |
| FR | 2937283 * | 4/2010 |
| JP | S52-002902 | 1/1977 |
| JP | S58-067502 | 4/1983 |
| JP | H02-299903 | 12/1990 |
| JP | H03-16711 | 7/1991 |
| JP | 2003-014052 | 1/2003 |
| JP | 2008-013879 | 1/2008 |
| JP | 2009-040331 | 2/2009 |
| JP | 2010-173617 | 8/2010 |
| WO | WO2009/022564 * | 2/2009 |

OTHER PUBLICATIONS

English translation of Notification of Decision of Refusal conducted in counterpart Japan Appln. No. 2013-514607 (Feb. 4, 2015).
English translation of Decision of Refusal conducted in counterpart Japan Appln. No. 2013-514607 (Feb. 4, 2015).
English translation of First Office Action conducted in counterpart China Appln. No. 201180030186 (Sep. 3, 2014).
English translation of Second Office Action conducted in counterpart China Appln. No. 201180030186 (May 5, 2015).

* cited by examiner

PNEUMATIC VEHICLE TYRE WITH AIR-DISCHARGING THREADS AND METHOD FOR MANUFACTURING AN ELECTRICALLY CONDUCTIVE COATING FOR THE AIR-DISCHARGING THREADS

CROSS-REFERENCE TO RELAYED APPLICATIONS

The present application is a U.S. National Stage of International Patent Application No. PCT/EP2011/056918 filed May 2, 2011, and claims priority under 35 U.S.C. §§365 and 119 of German Patent Application No. 10 2010 017444.0 filed Jun. 18, 2010.

BACKGROUND OF THE INVENTION

1. Field of the Invention

The invention relates to a pneumatic vehicle tire in radial construction having a carcass and having components adjoining the carcass, and thread-shaped elements arranged on at least one of the two surfaces of the carcass, which are provided for discharge of enclosed air between the carcass and the adjoining components during the tire construction. The invention also relates to a method for producing an electrically conductive coating for the thread-shaped elements.

2. Discussion of Background Information

Radial tires having thread-shaped elements for air discharge (so-called "air-discharging threads") are sufficiently known to a person skilled in the art. Such a pneumatic vehicle tire is known, for example, from DE 3 014 268 A1. Radial tires are distinguished by a radial extension of the carcass reinforcement. The carcass is produced in a textile calender, in that the inlay is coated using a mixture layer made of rubber.

In order to prevent air from being enclosed between components joined to one another during tire construction, and therefore, the quality of the tire from being decreased, the carcass component is covered after its production in the textile calender on the surface of the mixture layer using thread-shaped elements, which are arranged parallel to one another, for air discharge. This covering can be performed on one side, i.e., on only one of the two surfaces of the carcass, or on both sides or both surfaces of the carcass. The covering using the thread-shaped air-discharging elements, which are not electrically conductive or are inadequately electrically conductive, is typically performed at an interval of 25 to 40 mm. The air-discharging elements are, for example, cotton threads having a diameter of 0.05-1 mm. In the tire, the thread-shaped elements for air discharge extend in the radial direction and span the entire carcass layer width.

To be able to dissipate the electrostatic charge occurring during operation of the tire, the head region, which comes into contact with the roadway surface and includes treads, the bead region, which comes into contact with the tire rim, and at least one component, such as an inner layer, a carcass, or a side wall, which connects the tread and the bead region to one another, are made electrically conductive. This can be performed, for example, through the use of electrically conductive rubber mixtures. Electrically conductive means that the tire has an electrical resistance of at most $1 \times 10^8$ ohm.

Development is now directed to reducing the rolling resistance of the tire. One approach for reducing the rolling resistance is the use of low-rolling-resistance mixtures. They are preferably used as so-called "body mixtures" in the side wall region, for the inner layer and for the carcass. The hysteresis of these low-rolling-resistance mixtures may be decreased above all through the use of less-active fillers, smaller quantities of filler, or by replacing carbon black with silica. Thus, the use of these low-rolling-resistance mixtures results in an increase of the electrical resistance of these mixtures, however, so that the electrical conductivity drops. The required electrical resistance of the overall tire of $1 \times 10^8$ ohm to dissipate the electrostatic charge cannot be ensured.

So-called conductive carbon blacks are often used in ultralow concentrations in the above-mentioned components as a remedy. However, these have a very high reinforcing/stiffening effect and also have a negative effect on the hysteresis behavior and therefore the rolling resistance. So as not to exceed a required low stiffness of a mixture, e.g., in the side wall region, the degree of filling with other reinforcing fillers must be substantially reduced as a compensation for the conductive carbon blacks. In soft components such as the side wall, this can have the result that the total degree of filling is very low. As a consequence, a dispersion of the conductive carbon blacks, which have a high surface area, is no longer satisfactorily possible, with the disadvantages of excessively low strength or abrasion resistance, for example. In addition, such a measure based on conductive carbon blacks is costly.

SUMMARY OF THE EMBODIMENTS

Embodiments of the invention provide a cost-effective, high-quality pneumatic vehicle tire, which has an improved electrical conductivity using simple measures.

In embodiments, at least one thread-shaped, preferably air-discharging element, has a coating, which is electrically conductive, so that the coated thread-shaped, preferably air-discharging element forms an electrically conductive, thread-shaped element having an electrical resistance of $<1 \times 10^7$ ohm/cm.

In accordance with embodiments of the invention, through the simple measure of applying an electrically conductive coating around at least one thread-shaped, which is preferably an air-discharging element (preferably the so-called "air-discharging thread"), the electrical conductivity of the pneumatic vehicle tire is improvable. Thus, the thread-shaped element per se is not changed in its physical properties, but rather merely has an applied coating that is electrically conductive. Surprisingly, it has been shown that coated thread-shaped elements, preferably air-discharging threads, are completely sufficient to obtain the desired and required electrical conductivity of the tire having a maximum total resistance of $1 \times 10^8$ ohm.

The thread-shaped element can be an air-discharging thread or another non-air-discharging, thread-shaped element, which is arranged as a replacement or supplement on the surface of the carcass.

It is ensured that the dissipation of the electrostatic charge from the rim via the bead via the electrically conductive elements up to the electrically conductive head region is improved, even if none of the rubber mixtures that bridge the side region of the tire has an adequate electrical conductivity.

If the thread-shaped elements are air-discharging threads, the pneumatic vehicle tire is nonetheless of high manufacturing quality, since the air enclosed between the components during the tire construction can still be reliably discharged by the remaining air-discharging threads. The electrical conductivity of the pneumatic vehicle tire is improved using this simple and cost-effective measure. A complex structural measure does not have to be performed on the tire, for example, laying additional, electrically conductive rubber strips.

The term "coating" refers to an envelope, a coating, or a film around the thread-shaped element.

The expression "thread-shaped element" refers to a textile thread, yarn, or cord per se, such as preferably an air-discharging thread, without an electrically conductive coating.

The expression "electrically conductive, thread-shaped element" refers to the thread-shaped elements including the electrically conductive coating.

The term "head region" refers to the components of, e.g., treads, belt, and belt bandage of the tire and those intermediate layers that are arranged between these components.

The thread-shaped, electrically conductive element can be arranged on the outer surface, on the inner surface, on both the outer surface and the inner surface of the carcass, or on both surfaces alternately.

"Outer surface" refers to the surface of the carcass that faces toward the side wall, while "inner surface" refers to that surface of the carcass that faces toward the inner layer.

In an advantageous refinement of the invention, to ensure or improve the electrical conductivity, it is provided that between 1 and 20, preferably between 2 and 6 electrically conductive, thread-shaped elements are arranged on the surface(s) of the carcass, preferably distributed regularly over the carcass width, and alternating on the outer and inner surfaces.

In a further advantageous refinement of the invention, it is provided that the electrically conductive, thread-shaped element in the unvulcanized tire has an extensibility of 1.5% to 50%, preferably 5% to 25%. The electrically conductive, thread-shaped element permits a sufficient extension during the tire production and in the operating state in this manner and does not tend to break, which would result in an interruption of the conduction pathway.

In a further advantageous refinement of the invention, it is provided that the thread-shaped element comprises a material which is not electrically conductive, i.e., $>1\times10^7$ ohm.

In a further advantageous refinement of the embodiment, it is provided that the diameter of the thread-shaped element is between 0.01 and 1.5 mm, preferably between 0.05 and 0.5 mm, while advantageously does not differ from the dimension of the typically used air-discharging threads and is equivalent in its physical properties.

In a further advantageous refinement of the embodiment, it is provided that the electrically conductive, thread-shaped element has a titer<3000 dtex, preferably <500 dtex, while advantageously does not differ from the dimension of the typically used air-discharging threads.

In a further advantageous refinement of the embodiments, it is provided that the electrically conductive coating is an adhesion promoter, preferably a resorcin formaldehyde latex (RFL) dip, which contains electrically conductive particles, preferably carbon black having a specific surface area$\geq$50 $m^2/g$, for example, type N339 carbon black, and more preferably carbon black having a specific surface area$\geq$100 $m^2/g$. Coating a thread-shaped element with an adhesion promoter for good rubber bonding is known to a person skilled in the art. If electrically conductive particles, preferably dispersed particles, are now admixed with this adhesion promoter, the electrical conductivity and also the desired adhesion promotion and also good adhesion of the carbon black on the thread-shaped elements are provided.

Without requiring a further work step, using the typical so-called "dip procedure" of the thread-shaped element, during which it is drawn through the adhesion promoter liquid having the dispersed, electrically conductive particles, the electrically conductive and adhesion-promoting coating of the thread-shaped element is obtained. This is cost-effective and efficient.

The abbreviation "RFL" stands for resorcin formaldehyde latex.

The term "adhesion promoter" is to be understood as the adhesion-promoting coating applied around a strength carrier or around the components thereof.

The nonconductive materials of the air-discharging, thread-shaped elements can be, for example, polyester, polyamide, cotton, or hybrids of the these materials.

The air-discharging, thread-shaped element can include continuous filaments, textured filaments, or staple fibers.

It is advantageous if the coating, in relation to the blank thread-shaped element, makes up between 10 and 90 wt %, preferably between 10 and 50 wt %, particularly preferably between 15 and 35 wt % of the thread-shaped element dip pick up (DPU). A DPU between 15 and 35 wt % ensures sufficient electrical conductivity with a comparatively thin and therefore cost-effective coating, which can be applied in one dip procedure.

In a preferred embodiment, the pneumatic vehicle tire has a head region and bead regions made of electrically conductive rubber mixtures, while the rubber mixture(s) of the carcass and/or of the side wall region and/or of the inner layer is/are inadequately electrically conductive. In spite of the use of rolling-resistance-optimized material, i.e., "poorly" electrically conductive rubber mixtures in the side wall region and/or in the carcass and/or in the inner layer, improved electrical conductivity is achieved by the electrically conductive formation of fewer air-discharging threads through the electrically conductive coating thereof. It is thus ensured that the dissipation of the electrostatic charge occurs sufficiently from the rim via the bead via the electrically conductive elements up to the electrically conductive tread. The pneumatic vehicle tire is nonetheless of high manufacturing quality, since the air enclosed between the components during the tire construction can still be reliably discharged via the air-discharging, thread-shaped elements. Thus, complex structural measures on the pneumatic vehicle tire are not required.

"Inadequately electrically conductive rubber mixtures" refers to mixtures, with which the tire has an electrical resistance of $>1\times10^8$ ohm.

Almost any combination of polymer-based latex and carbon black or polymer-containing solvent and carbon black, respectively, which, after drying off of water or solvent, respectively, leaves behind a conductive film including at least polymer and carbon black on the nonconductive thread-shaped element as the carrier, can be used as the conductive dip.

The following procedure is used in the production of an electrically conductive RFL dip:
  producing/using an aqueous dispersion A of carbon black, which has 5 to 25 wt % carbon black, preferably 6 to 15 wt % carbon black, particularly preferably 7 to 10 wt % carbon black; and
  adding and mixing the aqueous dispersion A in a dispersion B, which is an RFL dip.

In the dry state, a carbon black proportion of 15 to 50 wt %, preferably a carbon black proportion of 20 to 40 wt % is therefore ensured to obtain the desired conductivity.

The dispersions A and B are advantageously mixed in a volume ratio between 50:50 and 70:30, preferably between 50:50 and 60:40.

A carbon black dip without RFL, which includes, for example, of carbon black, water and glycol, such as Colanyl black PR130 from Clariant, can also be used as the conductive dip.

After the thread-shaped elements are drawn through this carbon-black-containing RFL dip, which is produced from the two dispersions A+B, and after subsequent drying of the dip, a coating has formed as an electrically conductive and adhesion-promoting film around the thread-shaped element. The ratios of the dispersions A and B are to be selected in such a manner that the carbon black concentration in the dry film is sufficiently high to meet the above-mentioned conductivity requirements, but that the finished dip solution is neither excessively viscous nor poorly coating due to the high carbon black proportion.

The following table shows electrical resistances of electrically conductive coated air-discharging threads made of polyethylene terephthalate (PET) of the structure 235 dtex× 1.

TABLE

| Material of the air-discharging thread | Solution 1 in wt % Colanyl black PR 130 (from Clariant): 14.0 water: 43 RFL dip: 43 | Solution 2 in wt % Derussol 345 (from Evonik): 9.0 water: 45.5 RFL dip: 45.5 |
|---|---|---|
| PET 235 × 1 | $3 \times 10^5$ ohm/cm | $2 \times 10^5$ ohm/cm |

Embodiments of the invention are directed to a pneumatic vehicle tire in radial construction. The pneumatic tire includes a carcass having two surfaces, at least one component adjoining the carcass, thread-shaped elements being arranged on at least one of the two surfaces of the carcass, and at least one of the thread-shaped elements having a coating that is electrically conductive to form an electrically conductive, thread-shaped element having an electrical resistance of $<1\times10^7$ ohm/cm.

According to embodiments, the thread-shaped elements on the at least one surface of the carcass are structured and arranged to discharge during construction air enclosed between the carcass and the at least one adjoining component.

In accordance with other embodiments, the at least one of the thread-shaped elements may have a coating to form an electrically conductive, thread-shaped element comprises between 1 and 20 electrically conductive, thread-shaped elements being arranged on the at least one surface of the carcass. More particularly, the at least one of the thread-shaped elements can have a coating that is electrically conductive to form an electrically conductive, thread-shaped element comprises between 2 and 6 electrically conductive, thread-shaped elements being arranged on the at least one surface of the carcass.

According to other embodiments of the instant invention, in an unvulcanized tire, the electrically conductive, thread-shaped element can have an extensibility of 1.5% to 50%. More particularly, in an unvulcanized tire, the electrically conductive, thread-shaped element can have an extensibility of 5% to 25%.

In accordance with still other embodiments, the thread-shaped elements may not be electrically conductive.

In embodiments, diameters of the thread-shaped elements may be between 0.01 and 1.5 mm, and preferably between 0.05 and 0.2 mm.

In other embodiments, the electrically conductive, thread-shaped element may have a titer<3000 dtex, and preferably a titer<500 dtex.

According to still other embodiments of the instant invention, the electrically conductive coating is an adhesion promoter that contains electrically conductive particles. Further, the adhesion promoter can include a resorcin formaldehyde latex (RFL) dip and the electrically conductive particles can include carbon black having a specific surface area$\geq 50$ m$^2$/g, and preferably a specific surface area$\geq 100$ m$^2$/g. The electrically conductive coating may include a carbon black dip.

In still other embodiments, the electrically conductive coating can be between 10 and 90 wt % of the at least one electrically conductive, thread-shaped element, may preferably be between 10 and 50 wt % of the at least one electrically conductive, thread-shaped element, and may more particularly be between 15 and 35 wt % of the at least one electrically conductive, thread-shaped element.

According to embodiments, the pneumatic vehicle tire can further include a head region, bead regions, and sidewall regions and an inner layer arranged adjacent the carcass. Rubber mixtures of the head region and the bead regions can be electrically conductive rubber mixtures, and a rubber mixture of at least one of the carcass, the side wall region and the inner layer may be inadequately electrically conductive.

Embodiments of the invention are directed to a method for producing the above-described electrically conductive RFL dip. The method includes producing an aqueous dispersion of carbon black comprising 5 to 25 wt % carbon black, and adding and mixing the aqueous dispersion of carbon black in a dispersion of an RFL dip.

According to embodiments, the aqueous dispersion of carbon black can include at least one of 6 to 15 wt % carbon black and 7 to 10 wt % carbon black.

In embodiments, the dispersion of carbon black and the dispersion of RFL dip may be mixed in a volume ratio between 50:50 and 70:30.

In accordance with still yet other embodiments of the present invention, the dispersion of carbon black and the dispersion of RFL dip can be mixed in a volume ratio between 50:50 and 60:40.

BRIEF DESCRIPTION OF THE DRAWINGS

The invention will now be explained in greater detail on the basis of two figures, which show schematic exemplary embodiments. In the figures.

DETAILED DESCRIPTION OF THE EMBODIMENTS

Figure 1:
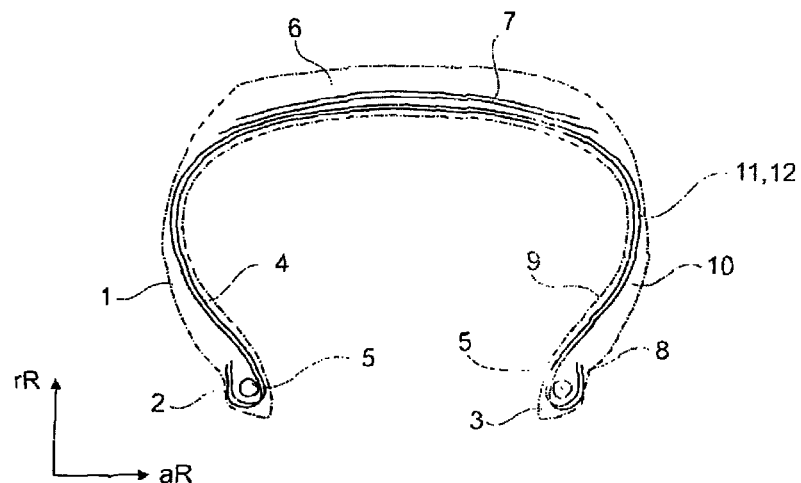
FIG. 1 shows a partial section through a pneumatic vehicle tire.
Figure 2:
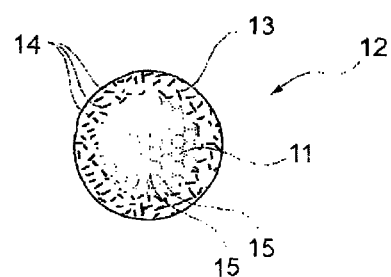
FIG. 2 shows a cross section through an electrically conductive, thread-shaped element.

FIG. 1 shows a radial partial section through a passenger automobile pneumatic vehicle tire. The pneumatic vehicle tire 1, which includes rubber mixtures, has a radial carcass 4, extending from bead region 2 to bead region 3. Carcass 4 includes an inlay made of strength carriers embedded in rubber being guided around bead cores 5, which have high tensile strength, from the axial inside to the axial outside, ending in a carcass fold-up 8. The pneumatic vehicle tire 1 also has a tread 6 and components, such as the inner layer 9 and the side wall 10, adjoining the carcass 4. The belt 7 is arranged between the carcass 4 and the tread 6. The inner layer 9 adjoins the inner surface of the carcass 4, while the side wall 10 adjoins the outer surface of the carcass 4. Thread-shaped elements in the form of air-discharging threads 11 made of cotton or PET of the structure of 50 to 500 dtex are arranged on at least one of the two surfaces of the carcass 4, cf. FIG. 2. The air-discharging threads 11 are used for the purpose of discharging the air enclosed during the tire construction between the carcass 4 and the adjoining components inner layer and/or side wall 9, 10.

The air-discharging threads 11 are arranged at an interval of 25 to 40 mm—measured in the peripheral direction—on the surface of the carcass 4 in radial orientation and have a diameter of <0.3 mm, preferably 0.05 to 0.2 mm. The air-discharging threads 11 preferably span the full carcass layer width.

Between 2 and 6 of the air-discharging threads 11 of the tire are designed to be electrically conductive as electrically conductive, thread-shaped elements 12, while the remaining air-discharging threads 11 are designed as known. These electrically conductive elements 12 are arranged distributed regularly around the circumference of the tire on the carcass 4. The electrically conductive, thread-shaped element 12 is an air-discharging thread 11 having an electrically conductive coating 13. The air-discharging thread is a yarn, comprising filaments 15, and has the structure 235 dtex×1. The coating, in relation to the blank thread-shaped element 11, makes up between 20 and 40 wt % of the thread-shaped element. The electrically conductive coating is resorcin formaldehyde latex (RFL) dip having carbon black with a specific surface area≥50 m$^2$/g, which has a carbon black proportion of 15 to 50 wt %, and preferably a carbon black proportion of 20 to 40 wt %, in the dry state. This abovementioned carbon-black-containing RFL dip ensures the desired electrical conductivity and simultaneously allows good bonding to rubber and good adhesion of the carbon black on the thread-shaped element. The coated air-discharging thread 12 and the air-discharging threads 11 are arranged over the entire axial width of the carcass 4.

LIST OF REFERENCE NUMERALS 1 pneumatic vehicle tire
2 bead region
3 bead region
4 carcass
5 bead core
6 tread
7 belt
8 carcass fold-up
9 inner layer
10 side wall
11 air-discharging thread (thread-shaped element)
12 coated air-discharging thread (electrically conductive, thread-shaped element)
13 electrically conductive coating
14 electrically conductive particle
15 filament
aR axial direction
rR radial direction

The invention claimed is:

1. A pneumatic vehicle tire in radial construction comprising:
    a carcass having an inner surface and an outer surface;
    at least one component adjoining the carcass, the at least one component being at least one of an inner layer adjoining the inner surface of the carcass and a side wall adjoining the outer surface of the carcass;
    a plurality of thread-shaped elements spaced from each other in a circumferential direction of the carcass and being arranged between at least one of:
        the inner surface of the carcass and the inner layer and the outer surface of the carcass and the side wall, wherein the plurality of thread-shaped elements comprise one of cotton or polyethylene and extend over an entire axial width of the carcass;
    at least one of the plurality of thread-shaped elements having a coating that is electrically conductive to form an electrically conductive, coated thread-shaped element having an electrical resistance of <1×10$^7$ ohm/cm; and
    at least one of the plurality of thread-shaped elements having no electrically conductive coating,
    wherein the plurality of thread-shaped elements define a plurality of air discharge paths between the at least one of the inner surface of the carcass and the inner layer and the outer surface of the carcass and the side wall, which are arranged to discharge, during construction, air enclosed between the at least one of the carcass and the inner layer and the carcass and the side wall.

2. The pneumatic vehicle tire as claimed in claim 1, wherein the at least one of the thread-shaped elements having a coating to form an electrically conductive, thread-shaped element comprises between 1 and 20 electrically conductive, thread-shaped elements being arranged on the at least one surface of the carcass.

3. The pneumatic vehicle tire as claimed in claim 1, wherein the at least one of the thread-shaped elements having a coating that is electrically conductive to form an electrically conductive, thread-shaped element comprises between 2 and 6 electrically conductive, thread-shaped elements being arranged on the at least one of the inner and outer surfaces of the carcass.

4. The pneumatic vehicle tire as claimed in claim 1, wherein, in an unvulcanized tire, the electrically conductive, thread-shaped element has an extensibility of 1.5% to 50%.

5. The pneumatic vehicle tire as claimed in claim 1, wherein in an unvulcanized tire, the electrically conductive, thread-shaped element has an extensibility of 5% to 25%.

6. The pneumatic vehicle tire as claimed in claim 1, wherein the thread-shaped elements are not electrically conductive.

7. The pneumatic vehicle tire as claimed in claim 1, wherein diameters of the thread-shaped elements are between 0.01 and 1.5 mm.

8. The pneumatic vehicle tire as claimed in claim 1, wherein diameters of the thread-shaped elements are between 0.05 and 0.2 mm.

9. The pneumatic vehicle tire as claimed in claim 1, wherein the electrically conductive, thread-shaped element has a titer<3000 dtex.

10. The pneumatic vehicle tire as claimed in claim 1, wherein the electrically conductive, thread-shaped element has a titer<500 dtex.

11. The pneumatic vehicle tire as claimed in claim 1, wherein the electrically conductive coating is an adhesion promoter that contains electrically conductive particles.

12. The pneumatic vehicle tire as claimed in claim 11, wherein the adhesion promoter comprises a resorcin formaldehyde latex (RFL) dip and the electrically conductive particles comprise carbon black having a specific surface area≥50 m²/g.

13. The pneumatic vehicle tire as claimed in claim 12, wherein the carbon black has a specific surface area≥100 m²/g.

14. The pneumatic vehicle tire as claimed in claim 11, wherein the electrically conductive coating comprises a carbon black dip.

15. The pneumatic vehicle tire as claimed in claim 1, wherein the electrically conductive coating is between 10 and 90 wt % of the at least one electrically conductive, thread-shaped element.

16. The pneumatic vehicle tire as claimed in claim 15, wherein the electrically conductive coating is between 10 and 50 wt % of the at least one electrically conductive, thread-shaped element.

17. The pneumatic vehicle tire as claimed in claim 15, wherein the electrically conductive coating is between 15 and 35 wt % of the at least one electrically conductive, thread-shaped element.

18. The pneumatic vehicle tire as claimed in claim 1, further comprising:
  a head region; and
  bead regions,
  wherein rubber mixtures of the head region and the bead regions are electrically conductive rubber mixtures, and a rubber mixture of at least one of the carcass, the side wall region and the inner layer is inadequately electrically conductive.

* * * * *